United States Patent
Frank et al.

(10) Patent No.: US 8,605,615 B2
(45) Date of Patent: Dec. 10, 2013

(54) METHOD AND APPARATUS FOR MULTI-RADIO COEXISTENCE WITH A SYSTEM ON AN ADJACENT FREQUENCY BAND HAVING A TIME-DEPENDENT CONFIGURATION

(75) Inventors: Colin D Frank, Park Ridge, IL (US); Sandeep H Krishnamurthy, Arlington Heights, IL (US); Robert T Love, Barrington, IL (US); Ajit Nimbalker, Buffalo Grove, IL (US); Ravikiran Nory, Buffalo Grove, IL (US); Kenneth A Stewart, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 245 days.

(21) Appl. No.: 13/051,048

(22) Filed: Mar. 18, 2011

(65) Prior Publication Data
US 2012/0236736 A1    Sep. 20, 2012

(51) Int. Cl.
H04L 12/26    (2006.01)

(52) U.S. Cl.
USPC .......................................................... 370/252

(58) Field of Classification Search
None
See application file for complete search history.

(56) References Cited

U.S. PATENT DOCUMENTS

| | | |
|---|---|---|
| 2006/0028376 A1 | 2/2006 | Theobold et al. |
| 2010/0067469 A1 | 3/2010 | Gaal et al. |
| 2010/0085917 A1* | 4/2010 | Gorokhov et al. ............ 370/328 |
| 2010/0234061 A1* | 9/2010 | Khandekar et al. ........... 455/522 |
| 2010/0273515 A1 | 10/2010 | Fabien et al. |
| 2010/0322066 A1* | 12/2010 | Chun et al. ..................... 370/210 |
| 2010/0322287 A1 | 12/2010 | Truong et al. |
| 2011/0134759 A1* | 6/2011 | Kim et al. ...................... 370/242 |

FOREIGN PATENT DOCUMENTS

| | | |
|---|---|---|
| EP | 1515488 A1 | 3/2005 |
| WO | 03001742 A1 | 1/2003 |

OTHER PUBLICATIONS

Patent Cooperation Treaty, "PCT Search Report and Written Opinion of the International Searching Authority" for International Application No. PCT/US2012/026227, Jun. 18, 2012, 10 pages.
Motorola, Inc., "LTE UE Minimum Transmission Bandwidth", 3GPP TSG RAN WG1 Meeting #48, R1-070757, Feb. 12-16, 2007, pp. 1-5, St. Louis, USA.

* cited by examiner

*Primary Examiner* — Minh-Trang Nguyen
(74) *Attorney, Agent, or Firm* — Sylvia Chen

(57) ABSTRACT

A method (500) and apparatus for multi-radio coexistence has a victim user equipment (UE) that receives (515) a sequence of subframes at a first transceiver from a serving base station, measures (520) channel state on the subframes to obtain channel state measurements, determines (530) a high-low interference pattern based on the channel state measurements, and transmits (550) to the serving base station a report that includes an indicator related to the high-low interference pattern. The method can include the victim UE receiving (610) an aggressor reference waveform (ARW) from the second transceiver, determining (620) spatial characteristics of the second transceiver from the ARW, and configuring (630) its antenna system based on the spatial characteristics. The method can have the victim UE determining (640) second transceiver characteristics from the ARW and transmitting (650) information regarding the second transceiver characteristics to its serving base station.

27 Claims, 7 Drawing Sheets

METHOD AND APPARATUS FOR MULTI-RADIO COEXISTENCE WITH A SYSTEM ON AN ADJACENT FREQUENCY BAND HAVING A TIME-DEPENDENT CONFIGURATION

This disclosure relates generally to improving coexistence among radios operating in adjacent frequency spectrum or bands. These radios may be collocated (i.e., within a single device) or non-collocated (i.e., not within a single device).

BACKGROUND OF THE DISCLOSURE

Coexistence refers to the ability for multiple wireless protocols to operate in or around the same or adjacent time-frequency radio resources without significant degradation to any radio's operation due to interference. Note that interference may occur at a reception radio frequency or at any intermediate frequency used within a receiving device for the purpose of demodulation. Without coexistence mechanisms, radio frequency interference can cause, amongst other degradations, loss of connectivity, decreased data throughput or reduction in quality of service, or increased current drain.

When adjacent radio spectrum frequencies are allocated to different uses, wireless interference can result. In general, there is an elevated risk of wireless interference when a frequency band used for uplink transmissions is adjacent to a frequency band used for downlink transmissions; the wireless transmissions in one band can create interference for wireless receivers operating in the adjacent band.

In Germany's 3GPP Bands 7/38, for example, spectrum from 2500-2570 MHz and 2620-2690 MHz will be deployed as paired spectrum using frequency division duplexing (FDD) 3GPP Long Term Evolution (LTE) mobile networking standards while spectrum from 2570-2620 MHz will be deployed as unpaired spectrum using time division duplexing (TDD) LTE mobile networking standards. Thus, the TDD LTE spectrum of Germany's Band 38 is between the paired FDD LTE spectrum in Germany's Band 7, and the TDD and FDD signals can interfere.

A common method applied to alleviate interference is to introduce "null" or "guard" frequency bands between deployed bands that are sufficient to reduce interference. However, there is very little guard (nominally zero) band between the Band 7 spectrum and the Band 38 spectrum as deployed in Germany. Some additional guard band may be deployed in practice, for example by reserving a portion of frequency spectrum from the edge of the paired or unpaired spectrum immediately adjacent to the other spectrum type, but this has the disadvantage of removing viable radio frequency spectrum from operational use.

As guard bands narrow, improved filtering and/or physical separation of transmit and receive antennas is commonly used to reduce interference caused by adjacent channel leakage (such as harmonics, intermodulation components, parasitic emissions, frequency conversion spurious emissions, etc.). Although this is feasible at base stations, improved filtering and antenna separation may be difficult or prohibitively expensive to implement in user equipment where physical constraints (such as small dimensions which result in low coupling losses between transmitting and receiving antennas) and low cost targets apply. Because multiple radios can wirelessly interfere with each other in various ways, and effective filtering may not be available at a reasonable cost, coexistence mechanisms should be developed for a variety of collocated and non-collocated scenarios.

With the continuing emergence of a variety of wireless communication technologies operating in adjacent frequencies, there is an opportunity to provide more effective solutions to mitigate interference and coexistence problems among collocated and non-collocated radios. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
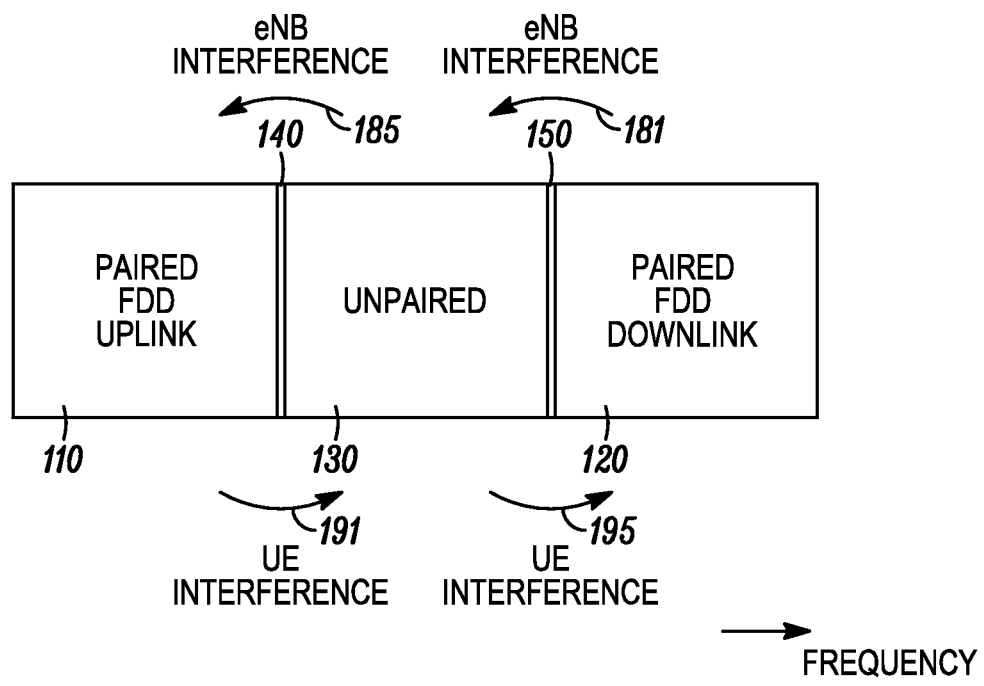
FIG. 1 shows an example of a spectrum allocation diagram with three adjacent frequency bands.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments. Also, flowchart boxes may be rearranged into different sequential orders, repeated, or skipped in certain instances.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

A method and apparatus for multi-radio co-existence includes a victim UE optionally storing a high-low interference pattern based on a time-dependent configuration (including a time and frequency dependent configuration) of a potentially interfering second transceiver on an adjacent frequency band. The victim UE receives a sequence of subframes from its serving base station. Then, the victim UE measures channel state on at least two subframes to obtain channel state measurements. Based on the channel state measurements, the victim UE determines a high-low interference pattern with a periodicity. The high-low interference pattern may be matched to a stored high-low interference pattern. The victim UE then transmits a report to its serving base station, with the report indicating the high-low interference pattern. The method can alternately or also include the victim UE receiving an aggressor reference waveform (ARW) from the second transceiver, determining spatial characteristics of the second transceiver from the aggressor reference waveform, and configuring its antenna system spatial processing based on the spatial characteristics of the second transceiver. It is possible for the victim UE to determine second transceiver characteristics from the aggressor reference waveform and transmit information regarding the second transceiver characteristics to its serving base station.

A wide variety of mechanisms can result in adjacent carrier system interference. Implementation of a method and apparatus for multi-radio coexistence with a system on an adjacent frequency band having a time-dependent configuration allows a victim UE to measure interference from a proximal adjacent carrier system TDD aggressor UE and relay information to the victim UE's base station scheduler so that the scheduler can mitigate the interference by avoiding the assignment of radio resources to the victim UE that are projected to overlap in time and/or adjacent frequency with the aggressor UE's uplink radio resources. Because non-collocated UEs may move relative to each other and thus increase or reduce interference levels, the scheduler may try to avoid projected overlapping time and/or adjacent channel leakage frequency wireless resources when the aggressor UE is proximal to the victim UE.

Note that in what follows, the concept of an "adjacent band" is one where first and second bands (or the frequency portion of time-frequency radio resources) are fully adjacent or partially adjacent. Here, fully adjacent means that the first and second frequency bands are disjoint while partially adjacent means that the first and second frequency bands may have common frequency elements. Also the concept of "proximal" is limited to spatial (geographic) proximity and does not include closeness in time or frequency.

FIG. 1 shows an example of a spectrum allocation diagram 100 with three adjacent frequency bands 110, 120, 130. In this example, paired frequency bands 110, 120 are deployed as 3GPP Long Term Evolution (LTE) frequency division duplex (FDD) uplink frequencies and downlink frequencies. Thus, for frequencies within the FDD uplink band 110, mobile stations are transmitting and base stations are receiving. Meanwhile, for frequencies within the FDD downlink band 120, base stations are transmitting and mobile stations are receiving. Note that a mobile station is sometimes called user equipment (UE) or a wireless terminal, among other things. Also, a base station is often called an evolved Node B (eNB), or occasionally a network access point (AP), and may also be referred to as a femtocell, picocell, or radio remote head.

In this example, an unpaired frequency band 130 is both adjacent to the upper edge of the FDD uplink band 110 and adjacent to the lower edge of the FDD downlink band 120. Note that the x-axis indicates frequency. In this example, the unpaired frequency band 130 is deployed for uplink and downlink transmissions (at different times) using time division duplexing. The deployment of FDD and TDD systems in adjacent frequency bands can cause interference.

A base station's transmissions in one frequency band may cause receiver desensitization (desense) at co-sited or nearby base stations that are tuned to receive signals in an adjacent band, especially if an antenna system of the second base station's receiver is directed toward the first base station's transmitting antenna system. For example, if a first base station (eNB) is transmitting on the FDD downlink 120 (most notably but not necessarily exclusively) near the lower-frequency edge, it may interfere 181 with a second base station receiving on the unpaired band 130 near the upper-frequency edge. As another example, if the second base station transmits on the unpaired band 130 (most notably but not necessarily exclusively) near the lower-frequency edge, it may interfere 185 with another base station (e.g., the first base station) receiving near the upper-frequency edge of the FDD uplink band 110. Note that an interfering eNB (also called an aggressor eNB) may be co-sited with an interfered—with eNB (also called a victim eNB), or the aggressor eNB and the victim eNB may be in nearby (but not co-sited) locations.

Adjacent band interference can also cause receiver desense in a mobile environment as well as a base station environment. When user equipment (UE) is transmitting on the FDD uplink 110 (most notably but not necessarily exclusively) near the upper-frequency edge, it may interfere 191 with a UE receiver operating in the unpaired band 130 near the lower-frequency edge. Similarly, a UE transmitting in the unpaired spectrum 130 (most notably but not necessarily exclusively) at the upper-frequency edge can cause interference 195 with a UE receiving in the FDD downlink band 120 at the lower-frequency edge. Note that an interfering UE (also called an aggressor UE) may be collocated with an interfered—with UE (also called a victim UE). In other words, the aggressor UE and the victim UE may be subsumed into a single device operating on both the FDD LTE system and the TDD LTE system and thus result in self-interference. Alternately, the aggressor UE and the victim UE may be in nearby (non-collocated) devices. When the aggressor UE and the victim UE are in separate mobile devices, movement of the devices (one, the other, or both) may increase or reduce interference simply because the transmitters and receivers are physically closer or farther away from each other.

Note that mobile devices may also enter into direct or peer-to-peer transmission modes where the concepts of "uplink" and "downlink" operation effectively become those of transmission from a first device to a second device, and a second device to a first device. Note also that the first and second transmissions may occur in precisely the same frequency band (such as in a time-division duplex or TDD system) or in substantially overlapping frequency bands. Finally, one or more of the interfering transmission or reception activities may include the act of broadcast or simulcast operation, where multiple devices receive a common transmission. All of these scenarios are applicable to the present disclosure.

Note that the degree of separation 140, 150 between adjacent bands may vary. FIG. 1 shows very little separation between the three bands 110, 120, 130. Greater separation (i.e., larger guard bands) can support reasonable-cost filtering and careful antenna system placement to reduce interference at the mobile stations and base stations. Although not shown in this example, the unpaired frequency band 130 and/or the paired frequency bands 110, 120 may include guard bands or sub-bands allocated for other purposes. As mentioned earlier, guard bands can assist in reducing interference. With less separation 140, 150 (i.e., smaller or no guard bands), the filtering at the base stations is more expensive, but usually not cost-prohibitive. With less separation, though, improved filtering at the mobile stations becomes very expensive and sufficient antenna system separation may become infeasible.

Although the three bands 110, 120, 130 have been described as an unpaired band 130 situated between the two parts of a paired spectrum 110, 120, adjacently interfering bands do not require this particular configuration. For example, there may be only two adjacent bands (e.g., one TDD band and one FDD band). The issue of adjacent channel interference occurs most notably when one frequency handles uplink transmissions and an adjacent frequency concurrently handles downlink transmissions, although it is also possible for concurrent adjacent uplink transmissions or concurrent adjacent downlink transmissions to result in interference. With a TDD carrier system adjacent to an FDD carrier system, interference may occur during some timeslots and not during other timeslots. Also, with an LTE enhanced Inter Cell Interference Coordination (eICIC) system adjacent to an FDD carrier system, interference may occur during some timeslots and not during other timeslots.

Figure 2:
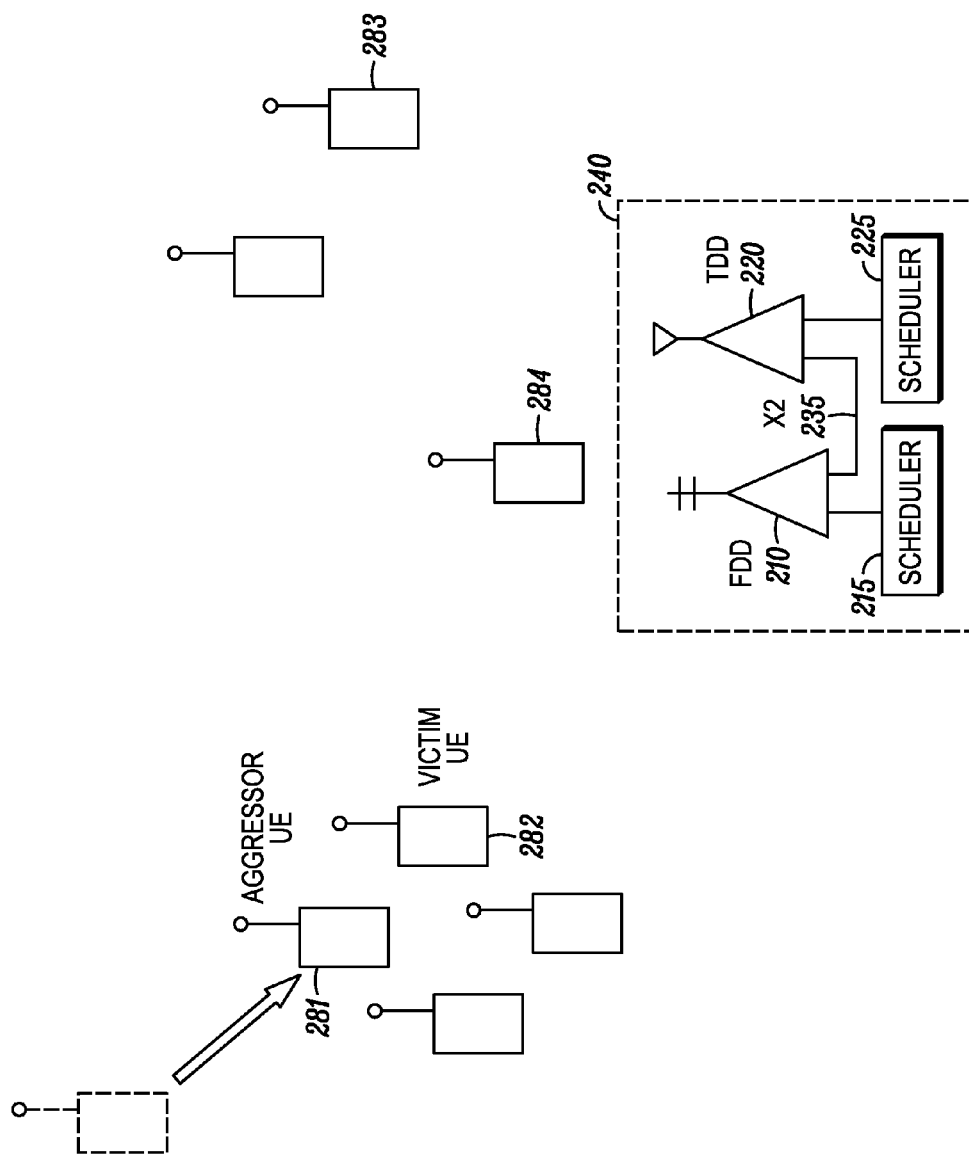
FIG. 2 shows an example of user equipment geographical distribution in a coverage region having a spectrum allocation diagram with adjacent frequency bands similar to FIG. 1.

FIG. 2 shows an example of user equipment geographical distribution 200 in a coverage region having a spectrum allocation diagram with adjacent frequency bands similar to FIG. 1. The region includes a first base station 210, which is an FDD base station in this example, for allocating frequency subcarriers and scheduling uplink and downlink communications with wireless user equipment operating in the paired FDD frequency bands 110, 120 of FIG. 1. The system also includes a second base station 220, which is a TDD base station in this example, for allocating frequency subcarriers and scheduling uplink and downlink communications with wireless user equipment operating in the unpaired TDD frequency band 130 of FIG. 1. The TDD base station is part of an adjacent carrier system relative to the FDD base station (and vice versa). The two base stations 210, 220 cooperate through a backbone interface 235. The backbone interface may be an X2 interface, a proprietary interface, or use some other standard such as Ethernet. The backbone interface 235 is usually wired but may be wireless. Each base station has a scheduler 215, 225 which controls the transmission and reception frequencies and timing assigned to each UE being served by that base station 210, 220.

The two base stations 210, 220 may be co-sited 240 as optionally shown. The co-sited base stations may be implemented as a single base station with a single scheduler, or the co-sited base stations may retain their separate identities and use two schedulers or a co-scheduler. Alternately, the base stations 210, 220 may be not co-sited but close enough to cause adjacent channel interference were coexistence methods not used.

Conventional approaches to mitigate interference 181, 185 (see FIG. 1) between the two co-sited (or closely located) base stations 210, 220 include stringent site filtering and physical separation of transmit and receive antenna systems. Also, adjacent channel interference can be reduced by one eNB locating its downlink carrier frequency on a raster location that provides a guard band with respect to the uplink band of the other eNB, although this is clearly inefficient in terms of downlink spectrum.

User equipment being served by either base station, perhaps including a mobile device being served by both base stations (e.g., collocated UEs), are geographically distributed around the base stations. As a UE moves and gets closer to another UE, interference 191, 195 may result as shown in FIG. 1. UEs may move to create a wide variety of geographic configurations, including within a building, inside a moving vehicle, and along streets and sidewalks. As particular UEs move apart, adjacent channel interference between those two UEs may decrease. At the same time, adjacent channel interference may increase due to a closer proximity to another UE.

If interference 191, 195 arises from operation in adjacent bands by the same device (i.e., collocated UEs), UE mobility does not (of course) reduce the interference but turning on/off any one of the transceivers would affect interference. In what follows, collocated victim and aggressor UEs may be within the same device (or UEs incorporated into a shared device) housing or physical implementation.

In an example, a first UE 281 transmits in a FDD frequency band to its serving base station 210 while a second UE 282 is receiving TDD signals in an adjacent frequency band from its serving base station 220. While the UEs 281, 282 are distant from each other (e.g., over 10 meters apart), the transmitted signal of the first UE 281 may not interfere much with reception at the second UE 282 in an adjacent band. When the UEs come close to each other (e.g., within 10 meters), however, the transmitted signal of the aggressor UE 281 may desense the victim UE's receiver such that the second UE 282 cannot properly receive and decode the signal in the adjacent channel from its serving base station 220. Although transmissions from nearby UEs may cause interference with reception by a victim UE 282, transmissions from distant UEs 283, 284 are less likely to cause significant interference while the second UE 282 is receiving.

In a first scenario, the aggressor UE 281 transmits during uplink subframes on the unpaired TDD band 130, and the intermittent transmissions may interfere with the victim UE 282 receiving on the paired spectrum FDD downlink band 120. In a second scenario, the aggressor UE 281 transmits on the paired spectrum FDD uplink band 110 while the victim UE 282 intermittently receives during downlink subframes in the unpaired TDD spectrum 130. Transmissions from the other UEs 283, 284 that are geographically separated from the second UE 282 are less likely to cause significant interference while the second UE 282 is receiving. Note that, in this Detailed Description, the aggressor UE is consistently considered the first UE 281 while the victim UE is consistently considered the second UE 282. The UEs, however, may be served by either (or both) of the base stations 210, 220, depending on each UE's configurations.

Figure 3:
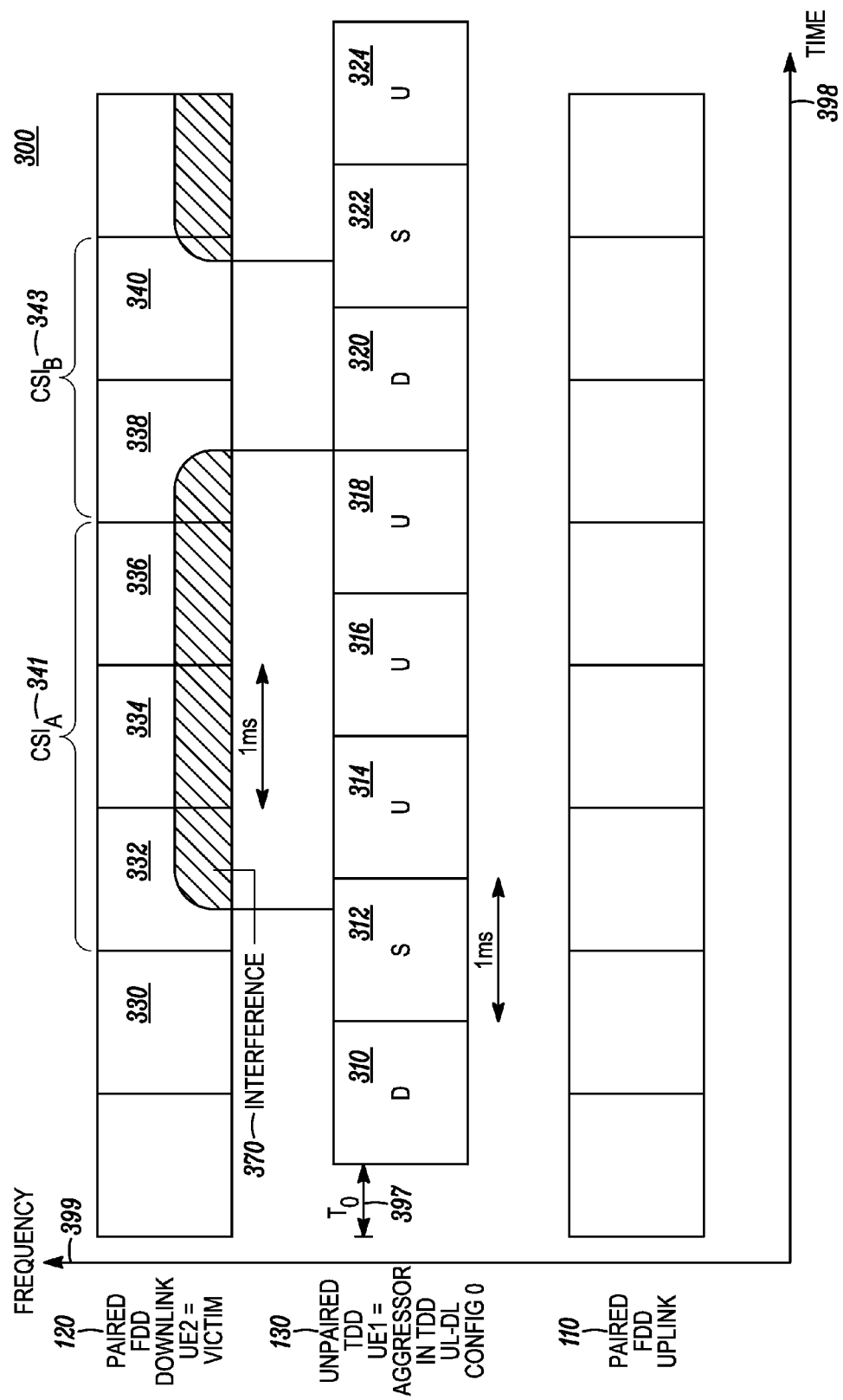
FIG. 3 shows an example of a time and frequency graph for multi-radio coexistence for aggressor and victim user equipment.

FIG. 3 shows an example of a time and frequency graph 300 for multi-radio coexistence for aggressor and victim user equipment such as UEs 281, 282 shown in FIG. 2. The x-axis 398 is time and the y-axis 399 is frequency. The example LTE subframes are 1 ms in duration and may use one or more frequency subcarriers within a frequency band to transmit the signals. A timing offset $T_O$ 397 indicates whether the subframes on each frequency band are synchronized ($T_O$=0) or not ($T_O$≠0). If the signals on the adjacent carriers are not transmitted from the same source (e.g., same eNB), the timing offset observed by the UE 281 will vary according to its position relative to the two signal sources. Note that this is timing offset is different from a timing advance. This timing offset information may be unknown to either UE and/or either eNB. In some situations, the timing offset may be known to one or more UEs (e.g., when the aggressor UE and the victim UE are collocated) or one or more base stations (e.g., when the FDD eNB and the TDD eNB are co-sited or share a backbone interface that communicates timing offset information). Note that the relative timing of signals in the frequency bands 110, 120, 130 may vary according to the relative synchronism of the base stations 210, 220, the relative positions of the UEs 281, 282, as well as other factors.

As mentioned with respect to FIG. 2's first scenario, the first UE 281 is transmitting during uplink subframes 314, 316, 318 and a portion of special subframe 312 on TDD frequency band 130 while a second UE 282 is receiving on an adjacent FDD frequency band 120. (In this particular example, the first UE 281 is using TDD downlink-uplink configuration 0, which will be explained in more detail later.) If the two UEs 281, 282 are near each other (e.g., within 10 meters of each other, including possibly being collocated within the same device), the signaling or data transmission on the upper subcarrier frequencies of the transmissions in subframes 312, 314, 316, 318 can cause interference 370 to signaling or data regions for the second UE 282 on the lower subcarrier frequencies of subframes 332, 334, 336, 338 during the overlapping time period when the first UE 281 is transmitting and the second UE 282 is receiving. Note that although the drawing shows a common situation of interference on contiguously adjacent frequency sub-carriers, this does not need to be the case because intermodulation, harmonics, and other spurious emissions may cause interference on non-contiguous adjacent frequencies.

Note that, because $T_O \neq 0$, only part of the sub-frames 332, 338 (in time) experience adjacent channel interference. This can also result from the spatial displacement of one or more of the UE's, possibly in combination with timing advance or adjustment procedures. If $T_O = 0$, then none of sub-frame 338 (in time) would experience adjacent channel interference but part of sub-frame 330 may experience adjacent channel interference during the latter part of special sub-frame 312. Also, depending on the amount of adjacent channel leakage and the "width" of the adjacent band, perhaps only parts of the reception sub-frames 332, 334, 336, 338 (in frequency) experience adjacent channel interference, as shown. Other situations may have differing amounts of the sub-frames 332, 334, 336, 338 (in frequency) that experience adjacent channel interference, and this frequency amount depends on filtering at the aggressor UE and at the victim UE, antenna separation between the aggressor UE and the victim UE, the power of the transmitted signal from the aggressor UE, the configuration of the transmission frequency at the aggressor UE, restrictions on UE emission spectra signaled by the eNB, and other factors.

If the two UEs 281, 282 are collocated (i.e., within the same device where it is noted that such a combination of UEs may be denoted as a single UE that is aggregating two or more of the frequency bands 110, 120, 130), the receiving UE 282 may be aware, through internal signaling, when the TDD UE 281 is transmitting and report the transmission frequency, timing, and duration information to the base station 210 serving the victim UE 282, and the scheduler 215 at the victim UE's serving base station 210 can make scheduling adjustments (in time and/or frequency) to mitigate interference.

The report by the victim UE 282 regarding the configuration of the aggressor UE 281 may include configuration information regarding the base station 220 serving the aggressor UE 281, such as downlink-uplink sub-frame configuration possibly including time and/or frequency dimensions, control channel configuration, or other variables. The report may include statistics on the interference received from the aggressor UE 281, including time and frequency statistics and patterns, power levels, or signal-to-noise ratios, etc.

If the two UEs 281, 282 are not collocated, the UEs may move freely relative to each other and thus sometimes be far away from each other and sometimes be near to each other. When the two UEs 281, 282 are near to each other, intermittent interference 370 is more likely to result.

Because the frame timing of the TDD and FDD networks may be uncoordinated and hence unsynchronized, the TDD and FDD frame boundaries (as well as subframe boundaries) may not be aligned. An FDD frame is also known as a radio frame in LTE, where a radio frame consists of 10 subframes each of 1 ms duration. Also, the relative timing of the FDD and TDD frame structures observed by the victim UE 282 may be different due to non-collocated cells in each network and due to timing advance of the TDD device.

When an aggressor TDD UE 281 comes into close proximity to a victim FDD UE 282, interference levels on certain FDD downlink sub-frames 332, 334, 336 of the victim UE 282 may be much larger on average than those on other FDD sub-frames 330. Taking measurements to determine two levels of interference, possibly to establish two types of Channel State Information (CSI), may help mitigate interference.

For example, if interference measurements show a periodic interference pattern with some FDD downlink sub-frames exhibiting high levels of interference and other FDD downlink sub-frames exhibiting low levels of interference, the victim UE 282 may estimate, partition, and report two interference level measurements (e.g., two CSI measurements). One value of interference level measurement corresponds to the subframes that experience high levels of interference and the other value corresponds to the subframes that experience low levels of interference. In FIG. 3, a first CSI value $CSI_A$ 341 could be reported for sub-frames 332, 334, 336 that have high interference measurements and a second CSI value $CSI_B$ 343 could be reported for sub-frames 330, 338, 340 that have low interference measurements. The pattern for interference measurements and the level of confidence regarding the $CSI_A$ and $CSI_B$ sub-frame ranges may be bolstered by knowledge of TDD downlink/uplink (DL/UL) configurations as shown in Table 1 below.

TABLE 1

| Downlink/ Uplink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where D designates a downlink sub-frame, S designates a special sub-frame, and U designates an uplink sub-frame. A special TDD sub-frame includes three sections: a downlink pilot time slot (DwPTS), a guard period (GP), and an uplink pilot time slot (UpPTS). Thus, a special subframe has both uplink and downlink components.

If measured interference levels at a victim UE 282 fluctuate periodically in a manner that corresponds to a known DL/UL configuration that might be applied at a TDD aggressor UE 281, it may be more certain that the measured interference levels at the victim UE reflect a repeating interference pattern. Because a TDD frame has 10 sub-frames, interference measurements can be taken once during each FDD sub-frame for 10 sub-frames to establish a TDD interference pattern. It is also possible to measure over fewer sub-frames (such as 5 consecutive sub-frames, due to the 5 ms switch-point periodicity of some of the TDD configurations). To account for timing offsets and the configuration of the TDD special sub-frame (plus temporal variations in adjacent channel interference), interference measurements can be taken over several repetition periods (e.g., 5 sub-frame or 10 sub-frame repetition periods) or over several frames, and the measurements can be averaged on a modulo basis (e.g., modulo 5 or modulo 10) over those multiple frames.

Thus, if a pattern develops such that a first subframe (subframe 0) of the multiple frames consistently has a low interference level, a next subframe (subframe 1) has both high and low interference levels over the multiple frames, subframes 2-4 have consistently high interference levels, subframes 5-6 have consistently low interference levels, and subframes 7-9 consistently have high interference levels, the victim UE can conclude that the aggressor UE is likely operating using TDD configuration 0. The subframe numbers of the measurements in this example match the TDD subframe numbers in Table 1 only for the sake of clarity. There is no assumption that the start of a TDD frame (or the start of any measurement period) is somehow aligned to the start of an FDD frame.

In an extension of this approach, because the dominant source of aggressor interference may be the uplink Physical Uplink Control Channel (PUCCH), and hence frequency-localized or band-edge transmissions, the victim UE may also offer a frequency-selective report, from the $CSI_A$ 341 region and/or the $CSI_B$ 343 region, to the victim UE's serving base station 210.

To address this extension, the interference pattern to be measured can be broken down in the time dimension (in terms of subframes or fractions of subframes) and in the frequency dimension (in terms of frequency blocks) where, for example, there might be two frequency blocks—one spanning the first half of a carrier bandwidth and the other frequency block spanning the second half of the carrier bandwidth. The frequency measurement granularity could also be in terms of K resource blocks (e.g. a resource block might have a 12 subcarrier frequency span and a 0.5 or 1 ms time span) and where K might be chosen to match the size of CQI subbands described in LTE.

Having the pattern also reflect the frequency dimension means having the ability to capture changes in the interference over the frequency dimension due to intermodulation roll-off over frequency or due to scheduler resource allocation restrictions (e.g., when resource blocks at an edge of a band are not allocated for uplink transmissions) already in place due to various interference issues such as to promote avoidance of UE receiver desense or because of adjacent band interference restrictions, for example, where the first 13 resource blocks in LTE Band 13 adjacent to the public safety band may have a maximum power limit that is reduced by 8 to 12 dB to minimize interference to narrow band public safety mobiles from LTE UE transmissions. By accounting for the frequency dimension, fewer resource blocks may be restricted for desense avoidance because some portions of the frequency band further away from the aggressor interference will not be impacted, or not be impacted as much, such that unaffected resource blocks can be allocated to the victim UE.

Thus, a victim UE 282 estimates the dimensions in time and/or frequency of high interference level regions 341 and low interference level regions 343. As stated previously, the victim device and its network may acquire system information on the TDD network configuration by other means, such as from a collocated UE or from a backbone interface 235 between base stations. System information may include, for example, the following information with respect to the aggressor network (LTE or other): the duplex type (TDD or FDD), the TDD UL/DL configuration (if TDD), the Special subframe configuration (if TDD), the cell ID, the PUCCH configuration, and the UL Sounding Reference Signals (SRS). In the situation where the victim and aggressor networks are co-owned or subject to a network sharing arrangement (or some other form of inter-network cooperation agreement), the victim network could receive the system information of the aggressor network from the aggressor network or via other means (e.g. storage means that is on the device or accessible by the device).

Another way that a victim FDD device 282 might acquire information regarding the TDD network configuration (e.g., from Table 1) is to receive information directly from the aggressor eNB's transmissions. For example, the victim UE 282 could reconfigure its receiver to try to receive and decode system information transmitted from the aggressor UE's base station 220. Given the need to reconfigure the victim UE 282 to support such reception, it would be necessary for most devices (e.g., those which would be unable to execute simultaneous observations of the aggressor and victim networks) to be provided measurement opportunities or "gaps" by the victim network in order to make such measurements of the aggressor network signaling. Such measurements could be used to establish the relative timing $T_O$ 397 of one or more cells on the aggressor network and the relative synchronism of those cells with the victim network. The victim device could, on an autonomous basis, determine whether it should assume that the configuration of a single aggressor cell 220 is maintained for all cells in the aggressor TDD network, or the rate at which the configuration of the aggressor network should periodically be re-examined.

The victim UE 282 could then report back to its base station 210 not only the proximal presence of an interfering UE 281 but also (for the purpose of scheduling) the observed configuration of the aggressor network and/or the victim UE's suggested configuration for the $CSI_A$-$CSI_B$ reporting partition.

When the aggressor UE 281 and the victim UE 282 are no longer proximal to each other, the interference measurements by the victim UE 282 will no longer exhibit a high-low pattern (or the highs and the lows will be less pronounced) because this type of adjacent band interference is less likely to occur when the UEs are distant from each other. Note that the victim UE 282 may be collocated with the aggressor UE 281, in which case the two UEs will always be proximal to each other (except when one of the transceivers is off).

By avoiding the scheduling of time-overlapping transmissions and receptions in adjacent bands of proximal FDD and TDD UEs, adjacent channel interference can be reduced. By disallowing adjacent channel leakage frequencies (e.g., near band edges) during those time periods when adjacent channel interference is likely due to proximity of aggressor and victim UEs, conventional mobile station filtering may be acceptable. When the aggressor UE and potential victim UE are no longer close to each other, the victim UE's base station scheduler can allocate frequency subcarriers and subframes without adjacent channel interference restrictions.

Figure 4:
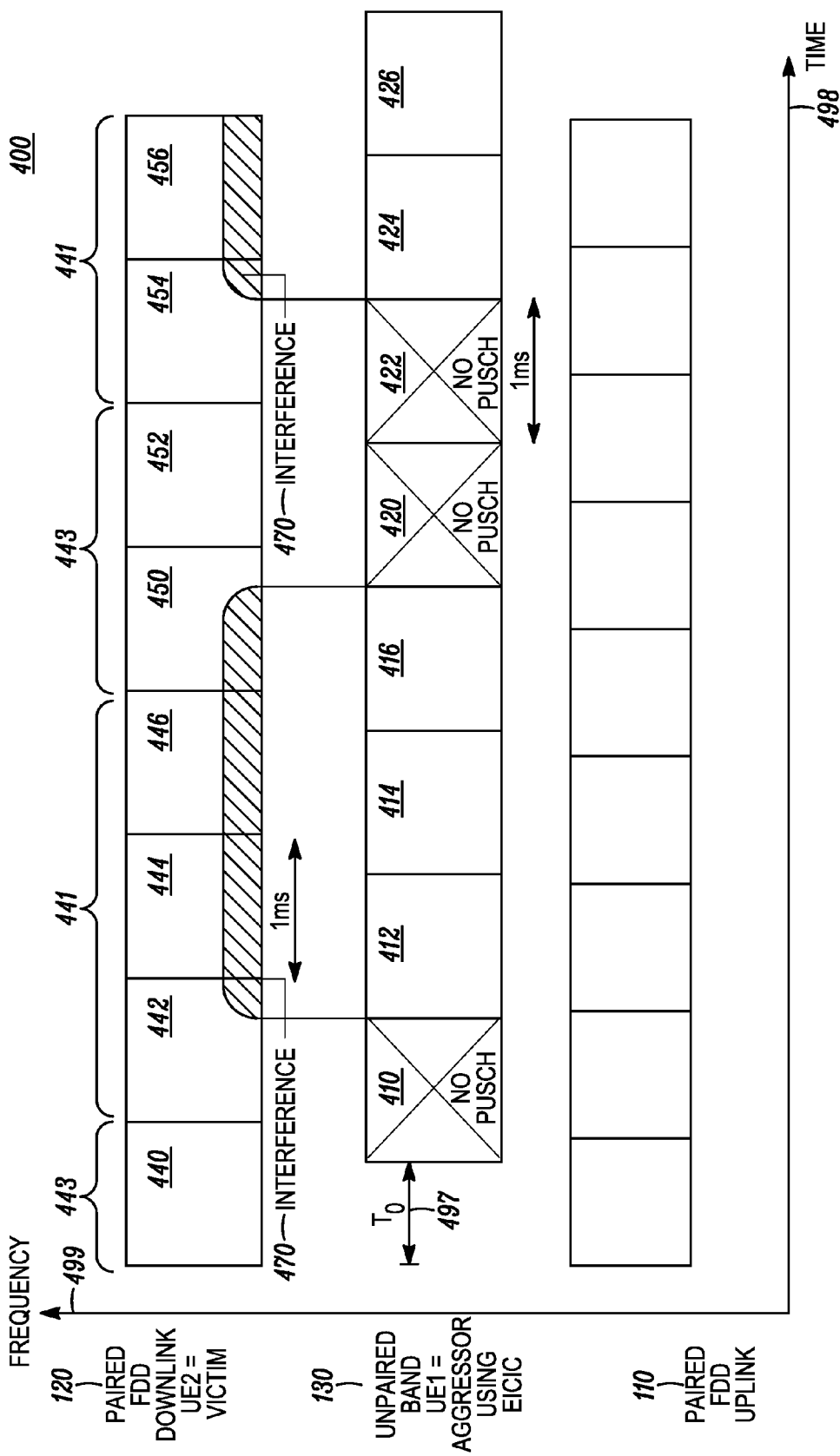
FIG. 4 shows another example of a time and frequency graph for multi-radio coexistence.

FIG. 4 shows another example of a time and frequency graph 400 for multi-radio coexistence for aggressor and victim user equipment. In contrast to FIG. 3, the unpaired frequency band 130 in FIG. 4 is not necessarily a TDD frequency band. Instead, the unpaired frequency band 130 is being used by a wireless system implementing enhanced Inter Cell Interference Coordination (eICIC). Enhanced Inter Cell Interference Coordination methods can be applied to both TDD and FDD networks. When using eICIC methods, downlink subframes are partitioned into low load subframes (also known as Almost Blank Subframes or ABS) and non-ABS subframes. The ABS subframes follow a certain time re-use pattern. For example, in FDD systems, ABSs repeat with a 40 ms periodicity. In TDD systems, ABSs repeat with a 70 ms periodicity for DL/UL configuration 0, repeat with a 20 ms periodicity for DL/UL configurations 1, 2, 3, 4, and 5, and repeat with a 60 ms periodicity for DL/UL configuration 6. Almost Blank Subframes are, as the name suggests, downlink subframes with low overhead transmission activity. In these subframes, the eNB transmits only signals and channels that are necessary to maintain backwards-compatibility (e.g. Sync Channels, CRS, PDCCH corresponding to SIBs, PDSCH corresponding to SIBs, etc). An eNB may typically avoid scheduling PDCCH transmissions in ABS for unicast traffic to/from the UE.

Because uplink grants (e.g., PDCCH downlink control information (DCI) allocating PUSCH resources on an uplink) and UL HARQ feedback bits (e.g., PHICH) may not be transmitted in ABS downlink subframes, not all uplink subframes can be scheduled with a PUSCH. For example, due to eICIC ABSs, subframes 410, 420, 422 may not be scheduled with uplink traffic. In other words, there may be no PUSCH transmission on such subframes (except for the semi-persistently scheduled PUSCH transmissions for which the corresponding PDCCH containing the DCI allocation PUSCH resources may be transmitted in a non-ABS DL subframe). This, in turn, results in periodic, time-varying PUSCH traffic—even when the aggressor UE 281 has unlimited data to be sent on the uplink. As a result, a proximal victim UE 282 experiences periodic, time-varying interference 470 during its downlink reception in adjacent frequencies. Notably, low interference levels 443 are expected to consistently occur in a pattern than corresponds to the ABS schedule used by a network implementing eICIC.

As with FIG. 3, the x-axis 498 is time and the y-axis 499 is frequency. The example LTE subframes are 1 ms in duration and may use one or more frequency subcarriers within a frequency band to transmit the signals. A timing offset $T_O$ 497 indicates whether the subframes on each frequency band are synchronized ($T_O=0$) or not ($T_O \neq 0$). This timing offset information may be unknown to either UE and/or either eNB. In some situations, the timing offset may be known to one or more UEs (e.g., when the aggressor UE and the victim UE are collocated) or one or more base stations (e.g., when the aggressor UE's eNB and the victim UE's eNB are co-sited or share a backbone interface that communicates timing offset information). Note that the relative timing of signals in the frequency bands 110, 120, 130 may vary according to the relative synchronism of the base stations 210, 220, the relative positions of the UEs 281, 282, as well as other factors.

Because the periodicity of proximal aggressor UE interference (when present) operating in an eICIC adjacent carrier system follows the ABS pattern periodicity in the aggressor UE's network, it is possible to determine and track such periodic interference (or, rather, non-interference) by means of interference measurements as described with reference to FIG. 3. For example, due to eICIC methods, no PUSCH is scheduled on certain subframes 410, 420, 422 while the other subframes 412, 414, 416, 424, 426 might have PUSCH resources granted to the aggressor UE 281. If the aggressor and victim UEs 281, 282 are near each other (e.g., within 10 meters of each other, including possibly being collocated within the same device), any signaling or data transmission on the upper subcarrier frequencies of the transmissions in subframes 412, 414, 416, 424, 426 can cause interference 470 to signaling or data regions for the second UE 282 on the lower subcarrier frequencies of subframes 442, 444, 446, 450, 454, 456 during the overlapping time period when the first UE 281 is transmitting and the second UE 282 is receiving. But lower levels of interference would be experienced by the victim UE 282 during subframes 440, 450, 452.

Note that, because $T_O \neq 0$, only part of the sub-frames 442, 450, 454 (in time) experience adjacent channel interference. This can also result from the spatial displacement of one or more of the UE's, possibly in combination with timing advance or adjustment procedures. If $T_O=0$, then none of sub-frames 440, 450, 452 (in time) would experience adjacent channel interference. Also, depending on the amount of adjacent channel leakage and the "width" of the adjacent band, perhaps only parts of the reception sub-frames 442, 444, 446, 450, 452, 454, 456 (in frequency) experience adjacent channel interference, as shown. Other situations may have differing amounts of the sub-frames 442, 444, 446, 450, 454, 456 (in frequency) that experience adjacent channel interference, and this frequency amount depends on filtering at the aggressor UE and at the victim UE, antenna separation between the aggressor UE and the victim UE, the power of the transmitted signal from the aggressor UE, the configuration of the transmission frequency at the aggressor UE, restrictions on UE emission spectra signaled by the eNB, and other factors.

If the two UEs 281, 282 are collocated (i.e., within the same device where it is noted that such a combination of UEs may be denoted as a single UE that is aggregating two or more of the frequency bands 110, 120, 130), the receiving UE 282 may be aware, through internal signaling, when the aggressor UE 281 is not transmitting due to eICIC and report the timing and duration information to the base station 210 serving the victim UE 282, and the scheduler 215 at the victim UE's serving base station 210 can make scheduling adjustments (in time and/or frequency) to mitigate interference.

The report by the victim UE 282 regarding the configuration of the aggressor UE 281 may include configuration information regarding the base station 220 serving the aggressor UE 281, such as ABS scheduling patterns. The report may include statistics on the interference received from the aggressor UE 281, including time and frequency statistics and patterns, power levels, or signal-to-noise ratios, etc.

If the two UEs 281, 282 are not collocated, the UEs may move freely relative to each other and thus sometimes be far away from each other and sometimes be near to each other. When the two UEs 281, 282 are near to each other, interference 470 is more likely to result.

Because the frame timing of the FDD and eICIC networks may be uncoordinated and hence unsynchronized, the FDD and eICIC frame boundaries may not be aligned. Also, the relative timing of the FDD and eICIC frame structures observed by the victim UE 282 may be different due to non-collocated cells in each network and due to timing advance.

When an aggressor eICIC UE 281 comes into close proximity to a victim FDD UE 282, interference levels on certain sub-frames 440, 450, 452 of the victim UE 282 may be much lower on average than those on other FDD sub-frames 442, 444, 446, 454, 456. Taking measurements to determine two levels of interference may help mitigate interference.

For example, if interference measurements show a periodic interference pattern with some FDD downlink sub-frames exhibiting high levels of interference and other FDD downlink sub-frames consistently exhibiting low levels of interference, the victim UE 282 may estimate, partition, and report two interference level measurements. In FIG. 4, a first CSI value $CSI_A$ 441 could be reported for sub-frames 442, 444, 446, 454, 456 that have high interference measurements and a second CSI value $CSI_B$ 443 could be reported for sub-frames 440, 450, 452 that consistent have low interference measurements.

The pattern for interference measurements and the level of confidence regarding the $CSI_A$ and $CSI_B$ sub-frame ranges may be bolstered by knowledge of eICIC ABS schedules as described previously. For example, the victim UE 282 can hypothesize all possible eICIC-influenced high-low interference patterns and determine the pattern which best matches to the interference measurements. This "matching" can be determined by a metric such as a correlation metric or a distance metric which is defined between the measurement and a pattern. Typically, the highest correlation metric and the smallest distance metric, respectively, correspond to the best match. (Note that other metrics, other than correlation or distance, can be used.)

A UE computation burden can be reduced if the victim network has some information pertaining to the aggressor UE's network interference characteristics (e.g., a victim TDD network can signal the periodicity associated with the aggressor FDD or TDD network's ABS pattern periodicity). If the victim network has more information, such as the set of ABS schedules that the aggressor network could be utilizing (note that the dynamic resource partitioning aspect of eICIC allows for the aggressor network to dynamically change the ABS pattern configuration), the victim UE's network can signal a plurality of high-low interference patterns to the victim UE that correspond to ABS patterns potentially configured by the aggressor UE's network.

If measured interference levels at a victim UE 282 fluctuate periodically in a manner that corresponds to a known ABS schedule that might be applied at an aggressor UE's network, it may be more certain that the measured interference levels at the victim UE reflect a repeating interference pattern. Because the longest periodicity of an ABS schedule is 70 ms (e.g., for an eICIC TDD system using DL/UL configuration 0), interference measurements can be taken once during each FDD sub-frame for 70 sub-frames to establish a possible ABS-related interference pattern. It is also possible to measure over fewer sub-frames (such as 20, 40, or 60 consecutive sub-frames, due to the 20 ms, 40 ms, and 60 ms periodicity of some of the ABS schedules or even as few as 8 or 10 sub-frames because some ABS schedules have a sub-periodicity of 8 ms or 10 ms).

To account for timing offsets and temporal variations in adjacent channel interference, periodic interference measurements can be taken several times over the repetition period of the ABS schedule (e.g., repetition periods of 8, 10, 20, 40, 60, or 70 ms) and the measurements averaged on a modulo (e.g., 8, 10, 20, 40, 60, or 70) basis over those multiple measurement periods.

Thus, if a pattern develops such that a first subframe (subframe 0) of the multiple measurement periods has a low interference level, while the next 3 subframes (subframe 1-3) have varying interference levels over the multiple measurement periods, a fifth subframe (subframe 4) has a consistently low interference level, followed by a sixth subframe (subframe 5) with a low interference level, three subframes (subframe 6-8) having varying interference levels, and a tenth subframe (subframe 9) having consistently low interference levels, the victim UE may conclude that the aggressor UE is operating using a particular ABS schedule in accordance with eICIC methods. See Table 4, Example Pattern 3 below.

Thus, a victim UE 282 estimates the dimensions in time and/or frequency of high interference level regions 441 and low interference level regions 443. As stated previously, the victim device and its network may acquire information on the eICIC network configuration by other means, such as from a collocated UE or from a backbone interface 235 between base stations. In the situation where the victim and aggressor networks are co-owned or subject to a network sharing arrangement (or some other form of inter-network cooperation agreement), the victim network could receive system information from the aggressor network.

When the aggressor UE 281 and the victim UE 282 are no longer proximal to each other, the interference measurements by the victim UE 282 will no longer exhibit a pattern of periodic low interference levels (or the highs and the lows will be less pronounced) because adjacent band interference is less likely to occur when the UEs are distant from each other. Note that the victim UE 282 may be collocated with the aggressor UE 281, in which case the two UEs will always be proximal to each other (except when one of the transceivers is off).

By avoiding the scheduling of time-overlapping transmissions and receptions in adjacent bands of proximal FDD and eICIC UEs, adjacent channel interference can be reduced. By disallowing adjacent channel leakage frequencies (e.g., near band edges) during those time periods when adjacent channel interference is likely due to proximity of aggressor and victim UEs, conventional mobile station filtering may be acceptable. When the aggressor UE and potential victim UE are no longer close to each other, the victim UE's base station scheduler can allocate frequency subcarriers and subframes without adjacent channel interference restrictions.

Figure 5:
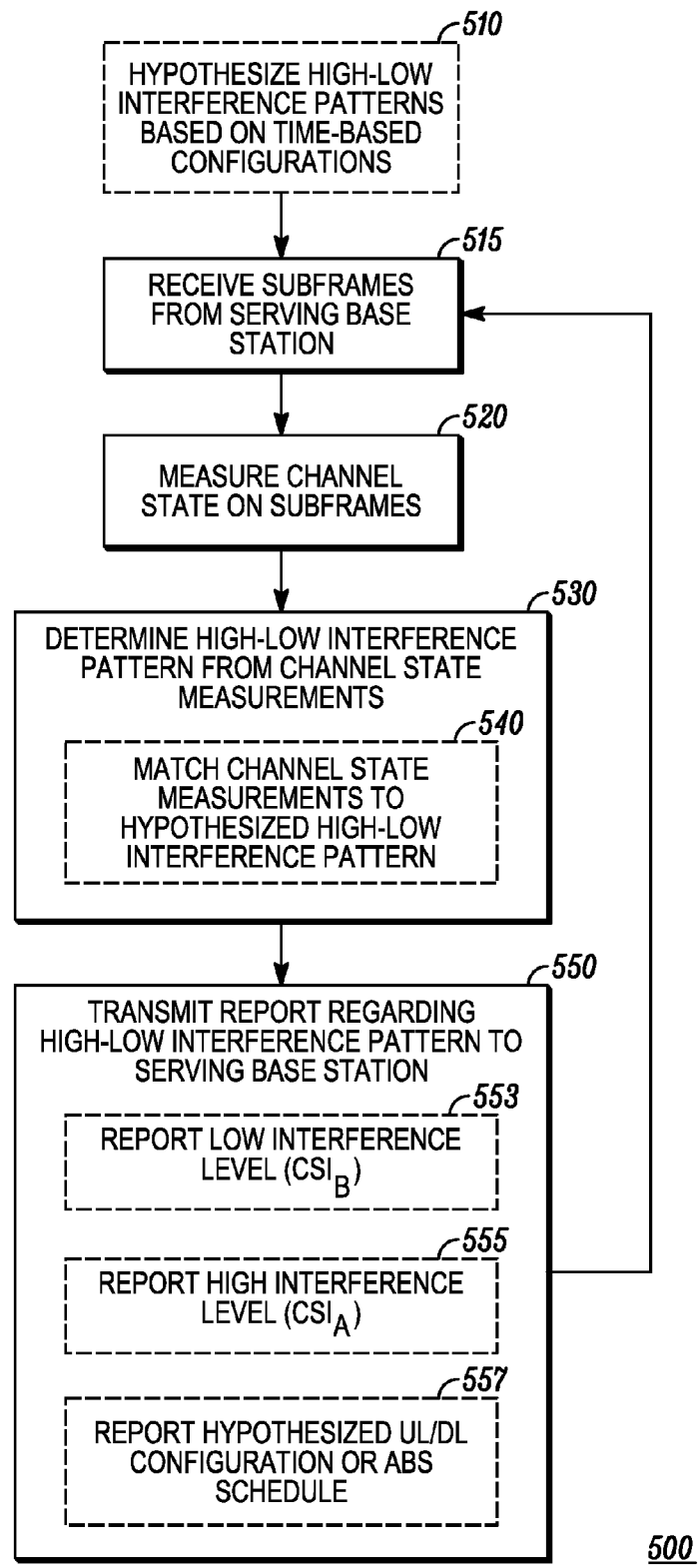
FIG. 5 shows an example flow diagram for a method for multi-radio coexistence at a victim transceiver.

FIG. 5 shows an example flow diagram 500 for a method for multi-radio coexistence at a victim transceiver, such as UE 282 in FIG. 2, when an aggressor UE 281 may be proximal and intermittently transmitting on an adjacent channel. Initially, the victim UE might hypothesize 510 possible high-low interference patterns such as the examples shown in Table 2 below. These high-low interference patterns are based upon possible downlink/uplink (DL/UL) configurations for a potential proximal TDD aggressor UE.

TABLE 2

| Downlink/ Uplink Con- figuration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | L | X | H | H | H | L | X | H | H | H |
| 1 | 5 ms | L | X | H | H | L | L | X | H | H | L |
| 2 | 5 ms | L | X | H | L | L | L | X | H | L | L |
| 3 | 10 ms | L | X | H | H | H | L | L | L | L | L |
| 4 | 10 ms | L | X | H | H | L | L | L | L | L | L |
| 5 | 10 ms | L | X | H | L | L | L | L | L | L | L |
| 6 | 5 ms | L | X | H | H | H | L | X | H | H | L | where L designates a low interference level sub-frame, X designates an unknown interference level sub-frame, and H designates a high interference level sub-frame. A representation of this Table 2 may be stored at the victim UE.

In another embodiment, the victim UE hypothesizes possible high-low interference patterns conditioned on the DL/UL configurations of a potential proximal TDD aggressor UE using frequency subsets. See the examples shown in Table 2a. In these examples, the first half of the carrier (or upper carrier frequency portion) is not expected to be affected while the second half of the carrier (or lower carrier frequency portion) is expected to be affected.

TABLE 2a

| Downlink/ Uplink Configuration | Downlink-to-Uplink Switch-point periodicity | Carrier Frequency portion | Subframe number | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 5 ms | Upper half | L | X | L | L | L | L | X | L | L | L |
| 0 | 5 ms | Lower half | L | X | H | H | H | L | X | H | H | H |

TABLE 2a-continued

| Downlink/Uplink Configuration | Downlink-to-Uplink Switch-point periodicity | Carrier Frequency portion | \multicolumn{10}{c}{Subframe number} |
|---|---|---|---|---|---|---|---|---|---|---|---|---|
| | | | 0 | 1 | 2 | 3 | 4 | 5 | 6 | 7 | 8 | 9 |
| 1 | 5 ms | Upper half | L | X | L | L | L | L | X | L | L | L |
| 1 | 5 ms | Lower half | L | X | H | H | L | L | X | H | H | L |
| 2 | 5 ms | Upper half | L | X | L | L | L | L | X | L | L | L |
| 2 | 5 ms | Lower half | L | X | H | L | L | L | X | H | L | L |
| 3 | 10 ms | Upper half | L | X | L | L | L | L | L | L | L | L |
| 3 | 10 ms | Lower half | L | X | H | H | H | L | L | L | L | L |
| 4 | 10 ms | Upper half | L | X | L | L | L | L | L | L | L | L |
| 4 | 10 ms | Lower half | L | X | H | H | L | L | L | L | L | L |
| 5 | 10 ms | Upper half | L | X | L | L | L | L | L | L | L | L |
| 5 | 10 ms | Lower half | L | X | H | L | L | L | L | L | L | L |
| 6 | 5 ms | Upper half | L | X | L | L | L | L | X | L | L | L |
| 6 | 5 ms | Lower half | L | X | H | H | H | L | X | H | H | L |

In Table 2a, the upper (or first) half of the carrier is further away from the aggressor UE and is assumed to be not impacted while the lower (or second) half of the carrier is assumed to be impacted. Of course, the frequency subsets could be different. For example, the split position may be different (e.g., the first third of the carrier band is in one frequency subset and the bottom two-thirds of the carrier band is in the other frequency subset) and/or there could be more granularity (e.g., use four frequency subsets instead of two).

Alternatively, the upper half frequency portion could be excluded from measurement reporting and only the bottom half frequency portion would be reported. A map or vector index could be included in the measurement report to indicate which frequency portions of the carrier band are being matched or are being reported. If the reporting is just whether the pattern matched (or not), then no map or vector index is needed, and one (or two bits) are sufficient to report for frequency granularity of two (or up to four) carrier frequency subsets. That is, for time and frequency based configurations, only a subset of the carrier frequency portions (as configured by higher layer signaling) are used to trigger a report. Alternatively, a triggered report contains a vector index indicating frequency-based or time-and-frequency based configuration pattern(s) matched, or it could contain the actual 2-D time and frequency dependent pattern or the quantized version of the 2-D time and frequency dependent pattern.

In another embodiment, when an aggressor UE's network implements eICIC, as described earlier, at least some eNBs within the network schedule data on only a subset of the downlink subframes and blank out transmission of PDSCH, PDCCH, PHICH, and PCFICH on the remainder (i.e., on ABSs). The participating eNBs exchange the ABS patterns they might be implementing over an X2 interface within the same network, but this information may not be exchanged between the aggressor UE's network and the victim UE's network. Downlink transmission restrictions implied by an ABS pattern results in an ABS-influenced uplink (UL) schedule, where the UL schedule constitutes the set of all UL subframes on which UEs being served by a particular eNB could be configured to transmit PUSCH. If a UE in the aggressor network is configured to transmit PUSCH on all subframes in the UL schedule, a proximal victim UE in adjacent frequencies can experience time-varying interference with periodic interference characteristics. In other words, the UE will not transmit on subframes 410, 420, 422 because they could not be assigned PUSCH due to ABSs.

The periodicity of the underlying interference (or, rather, non-interference) is a function of the periodicity of the underlying ABS pattern implemented by the aggressor network. For example, suppose that an eNB in an aggressor FDD network implements the following ABS pattern of 40 ms duration:

[11000010 11000010 11000010 11000010 11000010]

where '1' indicates an ABS and '0' indicates a non-ABS.

Then the UL scheduling and PHICH restrictions due to ABS imply that an aggressor UE connected to such a network has an UL schedule comprising PUSCH transmit ('T') and mute ('M') occasions as below:

[TTMTMMTT TTMTMMTT TTMTMMTT TTMTMMTT TTMTMMTT]

Note that the mute occasions are offset by four subframes from the ABSs, because PUSCH subframe resources are usually granted four subframes in advance of PUSCH transmissions. Note also that, in this example, PUSCH resources are being allocated to the aggressor UE at every available opportunity.

To a victim UE operating in adjacent frequencies, this results in the following high-low interference pattern over the same 40 ms duration:

[HHLHLLHH HHLHLLHH HHLHLLHH HHLHLLHH HHLHLLHH]

assuming that the aggressor UE transmits at each opportunity in a manner that interferes with the victim UE.

Since, in this example, the 40 ms pattern has a sub-pattern of 8 ms duration repeated 5 times, the victim UE can hypothesize a basic high-low interference pattern of period 8 ms HHLHLLHH for all possible (unique) cyclic shifts if the subframe timing of the aggressor network is not known to the victim UE a priori. For the sake of simplifying the explanation, this example assumes that the aggressor network and the victim network are subframe boundary synchronous (i.e., start of DL subframes are aligned between the two networks) but, they may or may not be radio frame synchronous. Also for the sake of a more straightforward description, this example assumes that the aggressor UE 281 transmits on every available subframe in a manner that causes measureable interference to the victim UE. If, however, the aggressor UE 281 does not transmit in such a manner, the low interference level measurements will continue to be consistent while the high interference level measurements may vary from low-to-high.

For FDD, the ABS pattern has a 40 ms periodicity and arbitrary sequences of ABS and non-ABS subframes can be configured. This results in a total of $(2^{40}-1)=1.1E12$ potential sequences which results in a prohibitively large number of high-low interference patterns if the victim UE were to hypothesize all possible combinations. But, in practice ABS patterns with some additional structure are used. For example, the 40 ms ABS pattern could further comprise:
  a. sub-patterns with 8 ms (or 10 ms) periodicity repeated 5 (or 4) times, and
  b. each sub-pattern has a sequence of $N_1$ non-ABSs followed by a sequence of $N_2$ ABSs followed by a sequence of $N_3$ non-ABSs such that $0 <= N_1, N_2, N_3 <= 8$ (or 10) and $N_1+N_2+N_3 <= 8$ (or 10).

Imposing such additional structure reduces the number of resultant high-low interference patterns to a manageable size. If the victim UE's network is aware of any underlying structure in the ABS patterns deployed by the aggressor UE's network, the eNB serving the victim UE can signal information pertaining to such structure (or alternately can signal the associated subset restrictions or relevant assistance information) to the victim UE 282.

Table 3 shows some more example ABS patterns that have sub-patterns of 8 ms and 10 ms periodicity. Table 4 shows the corresponding high-low interference patterns that a victim UE should observe as a result of eICIC deployment in the aggressor UE's network.

TABLE 3

Table 3: where '1' indicates an ABS subframe configured in the aggressor network eNB and '0' indicates a non-ABS subframe.

| ABS Pattern | ABS sub-pattern periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| Example Pattern 1 | 8 ms | 1 | 1 | 0 | 0 | 0 | 0 | 1 | 1 | — | — |
| Example Pattern 2 | 8 ms | 0 | 1 | 1 | 1 | 0 | 0 | 0 | 1 | — | — |
| Example Pattern 3 | 10 ms | 1 | 1 | 0 | 0 | 0 | 1 | 1 | 0 | 0 | 0 |
| Example Pattern 4 | 10 ms | 1 | 1 | 0 | 0 | 0 | 1 | 0 | 0 | 0 | 0 |

TABLE 4

Table 4: High-low interference patterns a victim UE can hypothesize as a result of the ABS patterns deployed by an aggressor UE's eNB per Table 3.

| ABS Pattern | ABS sub-pattern periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| Example Pattern 1 | 8 ms | H | H | L | L | L | L | H | H | — | — |
| Example Pattern 2 | 8 ms | H | H | H | L | H | L | L | L | — | — |
| Example Pattern 3 | 10 ms | L | X | X | H | L | L | X | X | H | L |
| Example Pattern 4 | 10 ms | H | X | H | H | L | L | X | X | H | L |

Note that the L interference level is offset by four subframes relative to the ABS subframe, because LTE systems generally grant uplink allocations to a UE 4 ms (i.e., 4 sub-frames) in advance of the UE's uplink transmission.

When an aggressor UE 281 is nearby, a victim UE 282 may experience periods of low interference when the aggressor UE 281 is receiving on its downlink sub-frame (or not transmitting on that sub-frame) and experience periods of high interference when the aggressor UE 281 is transmitting on its uplink sub-frames. Because special sub-frames include both uplink and downlink timeslots, the interference level experienced by a victim UE during a TDD aggressor's special sub-frame cannot be predicted. Because the victim UE's timing and the aggressor UE's timing may be offset by $T_O$ 397, the timing of the measurements by the victim UE may also affect whether the TDD special sub-frame and/or eICIC PUSCH subframe is measured by the victim UE as having a low interference level or a high interference level.

The victim UE receives 515 subframes from its serving base station and measures 520 channel state on at least some of those subframes of its down link channels. Channel state metrics include signal-to-noise ratio (SNR) or signal-to-interference plus noise ratio (SINR), overall received signal power level, precoding matrix indicator (PMI), precoding type indicator (PTI), and channel quality. Other metrics that are affected by interference, such as bit error rate (BER), frame error rate (FER), block error rate (BLER) corresponding to an actual or hypothetical packet-coded transmission, or channel quality indicator (CQI) may also be used to measure channel state. At the victim UE, channel state measurements should be taken at a periodicity and for a duration long enough to establish a pattern from the aggressor UE.

Through higher layer signaling from the serving base station, the victim UE may receive an indicator that identifies a subset of transmission resources within the subframes. This indicator can instruct the victim UE to measure channel state on the subset of transmission resources instead of the entire subframe or an arbitrary portion of the subframes as determined by the UE. The subset may be defined in time and frequency. Thus, according to Table 2a, the subset is defined in frequency. Other implementations may define only in time and yet other implementations may define in both time and frequency. Thus, the indicator can indicate a time pattern, a time-frequency pattern, an index to a set of time patterns, an index to a set of time-frequency patterns, a vector of indices to a set of time patterns, or a vector of indices to a set of time-frequency patterns.

For a TDD aggressor UE known to have one of the DL/UL configurations shown in Table 1, one channel state measurement every sub-frame for 10 sub-frames (i.e., for the duration of one frame) can be used to determine the TDD configuration pattern of the aggressor UE. Additionally, taking one channel state measurement every sub-frame during several frames and averaging the interference levels on a per-subframe basis (e.g., averaging all the subframe 0 interference levels, averaging all the subframe 1 interference levels, etc.) can reduce the effect of timing offsets, TDD special frame configurations, and temporal variations in adjacent channel interference. Note that, in the situation where multiple frames of channel state measurements are averaged on a per-subframe basis, the frames where channel state measurements are taken do not need to be contiguous.

For an eICIC aggressor UE, one channel state measurement every sub-frame for 8 or 10 sub-frames or every 20, 40, 60, or 70 subframes (e.g., for the repetition sub-period or period of an ABS schedule) can be used to determine the time-dependent configuration pattern of the aggressor UE.

After optional high-low interference hypotheses 510 are created and channel state measurements 520 are made, the victim UE 282 determines 530 a high-low interference pattern based on the channel state measurements. The pattern has a time-periodicity. For each hypothesis, the victim UE 282 can determine 540 whether the channel state measurements match to the hypothesized high-low interference pattern. This "matching" can be determined by a metric such as a correlation metric or a distance metric which is defined between the measurement and a pattern. Typically, the highest correlation metric and the smallest distance metric, respectively, correspond to the best match. (Note that other metrics, other than correlation or distance, can be used.) The matching calculations may deliberately skip the special sub-frames due to their downlink-and-uplink nature and/or use any known timing offset information.

The victim UE 282 then transmits 550 a report regarding the high-low interference pattern to its serving base station 210. The report may take several forms. For example, the report may include only the low interference level 553. This could be in the form of a SNR or SINR value, a BER, FER, or BLER value, an index value pointing to a particular interference level, and/or a $CSI_B$ 343 value. The report may indicate the timing (or periodicity) and duration of that low interference level. Alternately, or in addition, the report may include a high interference level 555 and/or the timing (or periodicity) and duration of that high interference level. Alternately, or in addition, the report may include the hypothesized DL/UL configuration 557 or hypothesized ABS schedule that matched to the interference measurements and/or the timing (e.g., frame starting time) of the hypothesized DL/UL or ABS configuration. This report may be used for mobility measurements such as Radio Resource Management (RRM) and Radio Link Management (RLM). After the report is sent, the flow returns to receiving subframes 515 (possibly after a delay period).

With the information reported by the victim UE 282, the victim UE's base station 210 scheduler 215 can adjust its downlink assignments to the victim UE in an attempt to avoid the periodic high interference levels that have been reported. Coexistence techniques include assigning downlink sub-frames to the victim UE that do not overlap (in time) with the hypothesized aggressor uplink sub-frames, scheduling PDSCH sub-carriers that do not overlap (in frequency) with the hypothesized aggressor UE uplink (perhaps including harmonics), and combinations of time and frequency adjustments. These adjustments may be used by the scheduler 215 for a preset period of time, or they may be set in place until the victim UE indicates a new time-based interference pattern or no time-based interference pattern.

Because non-collocated victim and aggressor UEs may move relative to each other, the flow returns to steps 515, 520 to measure channel state again, which may indicate that an aggressor UE has moved toward or has moved away from the victim UE. If the aggressor UE moves away, the transmitted uplink signals of the aggressor UE may cause less interference on the adjacent bands. Of course, a different aggressor UE may be moving closer to the victim UE and causing interference in a pattern that may differ from the high-low interference pattern of the previous aggressor UE. Additionally, there may be more than one aggressor UE, in which case the high-low interference levels from Tables 2, 2a, and/or Table 4 may be overlapped to create additional hypothesized high-low interference patterns.

Figure 6:
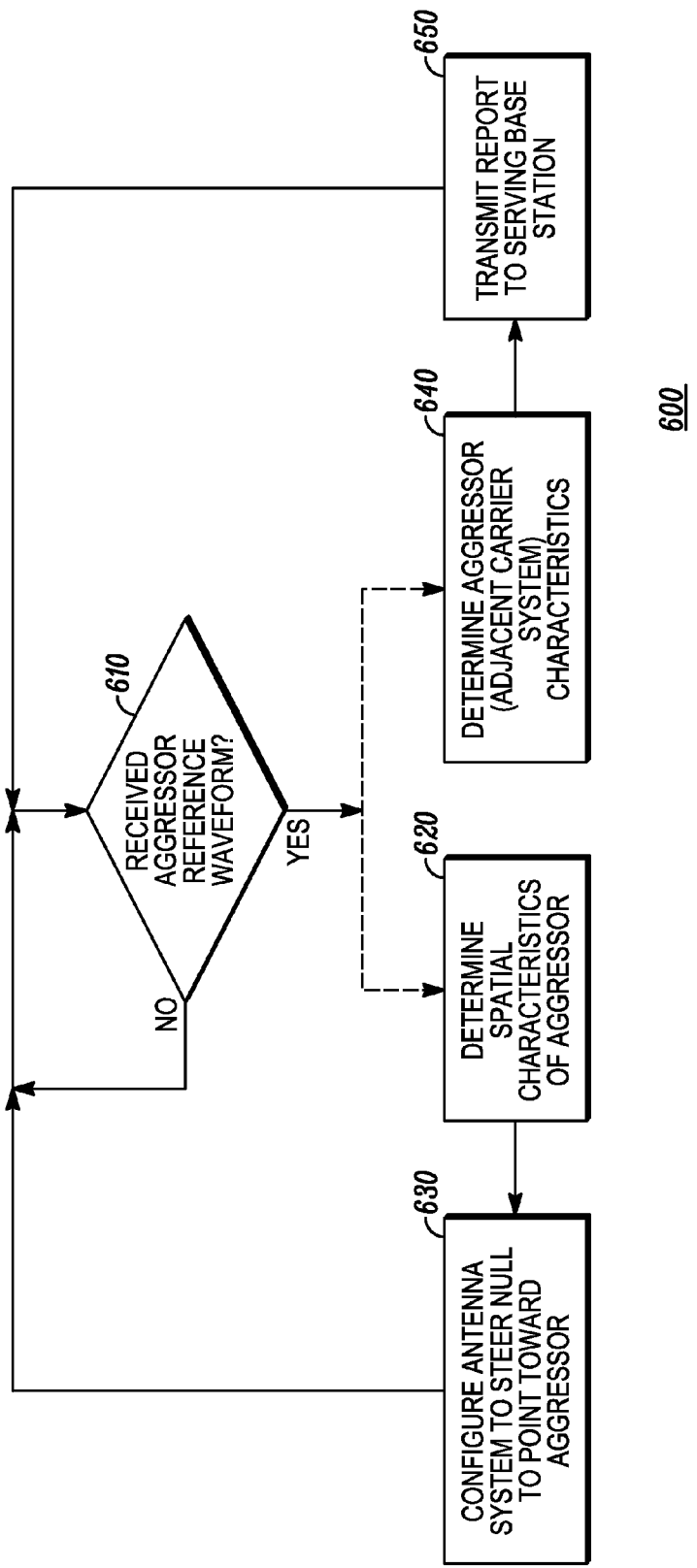
FIG. 6 shows an example flow diagram for another method for multi-radio coexistence at a victim transceiver.

FIG. 6 shows an example flow diagram 600 for another method for multi-radio coexistence at a victim transceiver. This flow diagram can be combined with the flow diagram of FIG. 5 to provide two methods for multi-radio coexistence at a victim UE. In this situation, an aggressor UE transmits a periodic or aperiodic, known signal which is referred to here as an Aggressor Reference Waveform (ARW). The ARW is designed to indicate the presence of an aggressor UE to proximal, potential victim UEs. The ARW may be used to train a spatial equalizer of the victim UE to steer an antenna null to point toward the ARW source (i.e., the aggressor UE) and thus reduce measured interference at the victim UE. Additionally, the ARW may include information regarding the aggressor base station and/or the aggressor UE.

First, the victim UE attempts to receive 610 an aggressor reference waveform (ARW). Generally speaking, a received signal at the victim UE is $y=f(s_{desired}, s_{aggressor}, H, z)$, where $s_{desired}$ is the desired signal from the victim UE's serving base station, $s_{aggressor}$ is the aggressor waveform from at least one proximate UE operating in an adjacent frequency band, H is the channel process corresponding to the desired signal, and z is the interference process. The UE receiver, for example, determines the spatial interference covariance matrix $R_{int}=E[zz^H]$ based on the (i) y received and (ii) knowledge of the template signal $s_{aggressor}$ corresponding to when y is received (i.e., training phase), where $(\cdot)^H$ denotes the Hermitian operator.

If no aggressor reference waveform is received, the victim UE will try to receive the ARW at a later time. If an ARW is received 610, the victim UE can use the ARW to determine 620 spatial characteristics of the aggressor UE. For example, after $R_{int}$ is determined, the victim UE uses this information to determine the demodulator coefficients based on Zero-Forcing/Weighted Least Squares (ZF/WLS), Minimum Mean Squared Error (MMSE), Maximum Likelihood (ML), or some other criterion such as beam-steering or spatial null insertion. This may include the location of the aggressor UE relative to the victim UE in two or more dimensions. Various techniques, such as estimating interference spatial covariance and training demodulator/beamformer weights using the ARW, can be used to determine spatial characteristics of the aggressor UE.

The spatial characteristics of the aggressor UE can be folded into the "aggregate" interference measurements that the victim UE observes. The spatial interference measurements can be used for configuring spatial processing in the demodulator that is based on a criterion such as minimum-mean squared-error (MMSE), maximum likelihood, or weighted least-squares. Once configured, the demodulator is used for decoding information payload transmitted by the serving base station (PDCCH, PDSCH, etc.). In principle, it may be possible to suppress interference (N−1) aggressor UEs using a receive antenna array of N spatially (or polarimetrically) diverse antenna elements in the victim UE. This is a realistic possibility for fixed wireless terminals (e.g., CPEs) where the spatial interference characteristics due to transmission from two or more aggressor UEs can be used to electronically beam-steer that victim UE's receive antenna array to suppress interference from aggressor UEs in addition to configuring the demodulator spatial processing.

Using the determined spatial characteristics of the aggressor UE 281, the victim UE configures 630 its antenna system spatial processing to steer a null to point toward the aggressor UE. By steering a null to the aggressor UE's location, signals from the aggressor UE can be reduced and thus result in less interference to the victim UE. At this point, the flow may return to attempting to receive 610 an ARW. In an alternate embodiment, the demodulator can be configured for spatial processing by utilizing spatial interference characteristics resulting from an aggressor UE's transmission. In one simple (suboptimal) method, the received signal vector can be projected into the nullspace of the spatial interference matrix followed by Maximum Ratio Combining (MRC) or MMSE processing.

If an ARW is received, the victim UE can additionally (or alternately) determine 640 second transceiver system characteristics from the ARW. If the ARW includes content such as the aggressor UE's DL/UL sub-frame configuration (e.g., an index to a particular configuration per Table 1) or ABS schedule, the aggressor UE's identity (or a portion of the UE identity), an uplink multiple-antenna configuration, and/or a PUCCH configuration, the victim UE may be able to demodulate and decode this information and transmit 650 the information to its serving base station 210. Some ARW information may be generic adjacent carrier system characteristics, and other ARW information may be unique to the aggressor UE. Characteristics of the second transceiver may be as simple as the fact that is it proximal to the victim UE. Based on the report, the serving base station can then make time and/or frequency adjustments to its downlink assignments to attempt to reduce interference from the aggressor UE.

Because non-collocated victim and aggressor UEs may move relative to each other, the flow returns to step 610 to check for an ARW at a future time. If the aggressor UE moves away from the victim UE, the ARW may become weaker and the aggressor UE's transmitted uplink signal may also cause less interference on the adjacent bands. Of course, a different aggressor UE may be moving closer to the victim UE and the new ARW would be processed to determine 620 spatial characteristics of the aggressor UE and/or determine 640 second transceiver characteristics. Additionally, there may be more than one aggressor UE, in which case multiple ARWs would be processed.

In order to train a victim UE's demodulator to spatially suppress proximal aggressor UE interference, one can envision a scenario where all UEs in the aggressor network may be required (by specification and/or by regulatory mandate) to transmit an ARW. In this case, the aggressor UE's network can configure a periodic schedule for the aggressor UEs to transmit ARW (over a certain time/frequency resources in selected subframes) in a pre-determined or a semi-statically configured manner. If semi-statically configured, the aggressor UE's network can communicate the aggressor UE transmit schedule to the victim network over an S1 or X2 backhaul (which the victim UE's network can then relay to the victim UE, in turn, over signaling through the victim UE's serving eNB).

In addition to the aggressor UE ARW transmission schedule, other characteristics such as the signal sequence (e.g., QPSK sequence obtained from a Gold sequence generator) associated with the ARW and the time-frequency location of the set of resource elements to which the signal sequence is mapped can be signaled from the victim UE's serving eNB to the victim UE. The ARW transmitted by the aggressor UE may be a function of one or more of: UEID, symbol index, slot number, subframe number, TDD DL/UL configuration of the aggressor UE's network, and radio frame number. Although, in order that this scheme can be implemented with minimum signaling overhead (e.g., over the backhaul or between the victim UE's serving eNB and victim UE), specifying ARW independently of UEID, TDD DL/UL configuration, radio frame number, etc. would be desirable.

The CSI feedback must be inline with the spatial processing adopted by the victim UE. There is potentially a benefit in the UE feeding back the measured spatial interference characteristics by means of Precoding Matrix Indicator (PMI), Rank Indicator (RI), and/or CQI reporting. Additionally, victim UE feedback of the interference spatial covariance matrix or channel directivity information (comprising the projection of the signal subspace into the null space of the interference plus noise covariance subspace) can help the victim UE's serving cell in its scheduling decisions.

Figure 7:
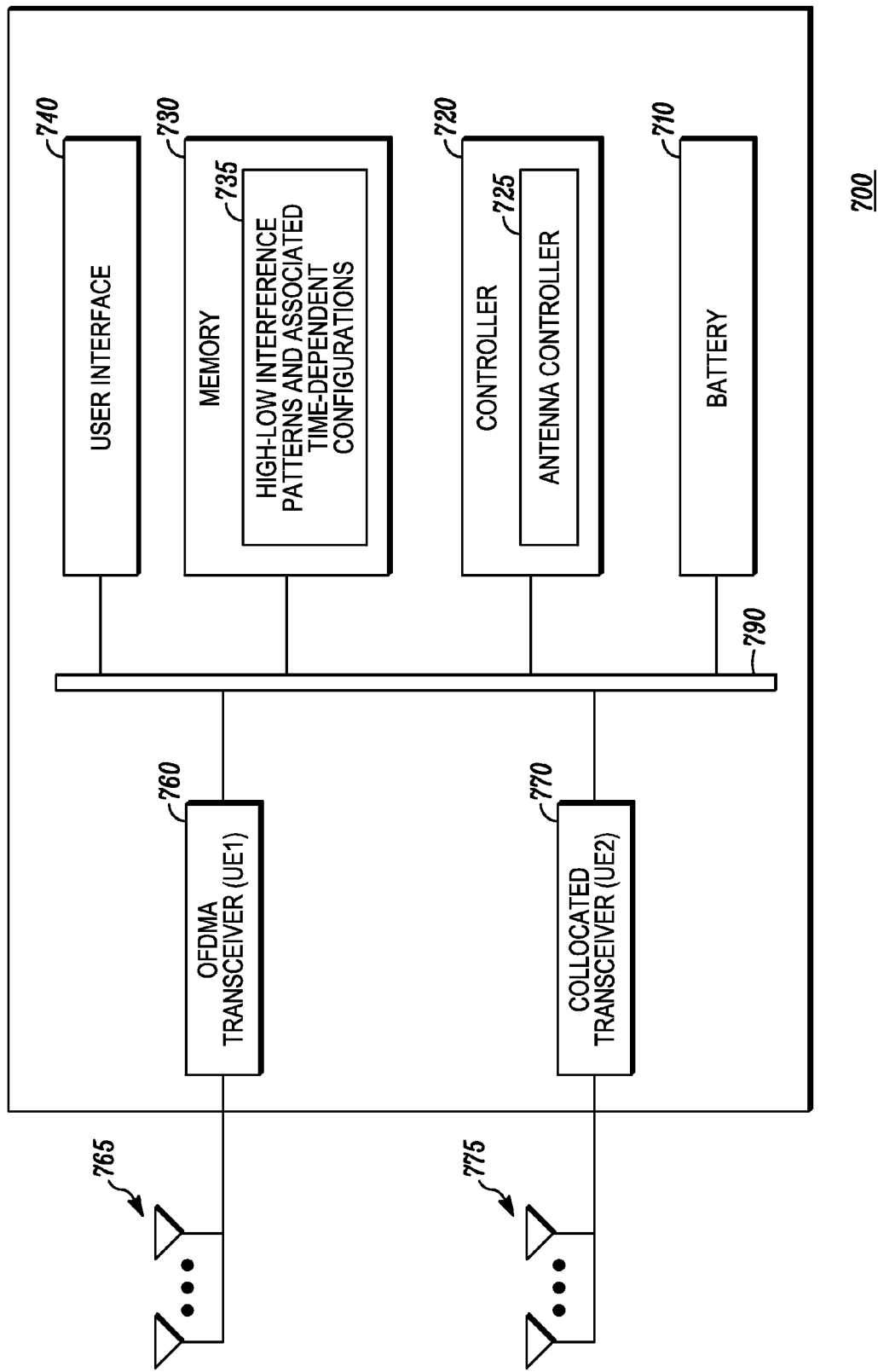
FIG. 7 shows an example block diagram of an orthogonal frequency division multiple access (OFDMA) user equipment with an optional collocated second transceiver.

FIG. 7 shows an example block diagram of an orthogonal frequency division multiple access (OFDMA) user equipment 700 with an optional collocated second transceiver 770. The user equipment could be the victim UE 282 or a single mobile device containing collocated aggressor and victim transceivers 281, 282. The UE block diagram is greatly simplified to focus only on details that are pertinent to multi-radio coexistence.

The UE 700 includes a battery 710 or other portable power source, a controller 720 for controlling the various components of the UE 700, and a memory 730 for storing programs and data for the UE 700 and its controller 720. The UE 700 also includes a user interface 740 including components such as a loudspeaker, a microphone, a keypad, and a display.

The memory 730 can include a memory portion 735 for high-low interference patterns along with their associated TDD DL/UL configurations and/or ABS schedules. These patterns can be used (as described with reference to FIG. 5) to identify the DL/UL configuration and/or ABS schedule being used by a proximal aggressor UE and predict future interference patterns.

A first OFDMA transceiver 760 is coupled to the other components through a bus 790. The first transceiver can be coupled to a multi-port or multi-antenna MIMO antenna system 765 for LTE signaling. Optionally, the UE can include a second transceiver 770 with a shared or secondary multi-antenna subsystem 775 responsive to a specific radio technology or modulation type such as LTE, HSPA, or OFDMA. When two transceivers are within a single device, the first and second transceivers are collocated. If the transmitter of the first transceiver 760 is transmitting on a frequency that is adjacent to an operating frequency of the receiver of the second transceiver 770, interference is likely to result unless coexistence tactics are used. The controller 720 is aware of the uplink and downlink operational frequencies and timing of both transceivers, and the controller 720 can direct the first transceiver 760 to inform its serving base station regarding the need for coexistence between the collocated transceivers.

The victim transceiver may report high and/or low interference levels, timing, and/or duration to its serving base station as described with reference to FIG. 5. Alternately, or in addition, the victim transceiver may report the hypothesized DL/UL configuration of a proximal TDD transceiver as described with reference to FIG. 5 (or possibly the actual DL/UL configuration if the TDD transceiver is collocated) and/or the hypothesized ABS schedule (or possibly the actual ABS schedule if the eICIC transceiver is collocated). If an ARW is received, the victim transceiver may report second transceiver characteristics (including second UE identity information and/or adjacent carrier system characteristics) to its base station as described with reference to FIG. 6. When the victim UE's base station receives any of these reports, the associated scheduler may schedule sub-frame and/or sub-carrier assignments to mitigate the potential interference from a proximal aggressor transceiver based on the report(s).

In addition to the reporting functions of the victim transceiver, the controller 720 of the victim transceiver can include an antenna controller 725 spatial equalizer to configure the antenna system 765 spatial processing of the victim transceiver to steer a null toward the aggressor UE as described with reference to FIG. 6. By steering a null to point toward the aggressor UE, the victim UE may be able to reduce interfering signal levels from the aggressor UE.

A method and apparatus for multi-radio coexistence detects interference from a proximal aggressor UE exhibiting a time-dependent configuration and operating in an adjacent frequency band. If a proximal aggressor UE interference pattern is detected by a victim UE, or information is received by the victim UE indicating time-based interference from a proximal aggressor UE, the victim UE can transmit a report to its serving base station, and the serving base station's scheduler can assign time-frequency resources that mitigate the proximal aggressor UE's interference based on the report. The serving base station's scheduler can assign time-frequency resources without respect to proximal aggressor UE interference when the victim UE no longer detects a proximal aggressor UE time-based interference pattern and/or no longer receives information indicating an aggressor UE is nearby.

In addition, or alternately, an aggressor reference waveform (ARW) can be transmitted by an aggressor UE to indicate interference from a proximal aggressor UE. A received ARW can be used by the victim UE to train a spatial equalizer of the victim UE to steer an antenna null to point toward the ARW source. A received ARW can be used to obtain information regarding the proximal aggressor UE and/or its aggressor eNB, which may be relayed to the victim UE's base station for interference mitigation by the associated scheduler.

Although the examples of time-dependent configurations on adjacent carrier systems have been described in detail as behaviors of TDD and eICIC systems, other systems and other behaviors may be encompassed by the invention.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

For example, although LTE systems have been described in detail, teachings from this specification may be applied to TDMA/GSM systems, other types of OFDMA systems, and other wireless access technologies. Also, although wide area networks have been implied, teachings from this specification may be applied to local area networks and personal area networks. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It is further understood that the use of relational terms such as "first" and "second", "top" and "bottom", and the like, if any, are used solely to distinguish one from another entity, item, or action without necessarily requiring or implying any actual such relationship or order between such entities, items or actions. The use of the terms "high" and "low" are relative terms and the thresholds for "high" and "low" may be static or change dynamically, be based on raw measurements, mathematically manipulated measurements (e.g., mean, median, mode), and/or percentages.

Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as "one or more" unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

As understood by those in the art, a mobile device includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Moreover, it will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for multi-radio coexistence comprising:
receiving a sequence of subframes at a first transceiver from a serving base station;
measuring channel state on at least two subframes within the same frame within the sequence of subframes to obtain channel state measurements for the at least two subframes;
determining a high-low interference pattern for the at least two subframes with a periodicity based on the channel state measurements; and
transmitting a report to the serving base station, the report including an indicator related to the high-low interference pattern, wherein the indicator indicates a high interference level for a first subframe and a low interference level for a second subframe.

2. The method of claim 1 wherein the periodicity is based on a time-dependent configuration of a potentially interfering second transceiver on an adjacent frequency band.

3. The method of claim 2 wherein the potentially interfering second transceiver is a user equipment.

4. The method according to claim 2 wherein the periodicity is based upon an uplink transmission configuration of the potentially interfering second transceiver.

5. The method of claim 1 wherein determining the high-low interference pattern comprises:
determining, for each subframe, that the subframe has a high interference level if the channel state measurement for the subframe is within a first range.

6. The method of claim 5 wherein the report comprises:
a high interference level measurement.

7. The method according to claim 5 wherein the report comprises:
a first channel state information based on the high interference level.

8. The method of claim 5 wherein the determining a high-low interference pattern comprises:
determining, for each subframe, that the subframe has a low interference level if the channel state measurement for the subframe is within a second range that does not overlap the first range.

9. The method according to claim 8 wherein the report comprises:
a low interference level measurement.

10. The method according to claim 8 wherein the report comprises:
a second channel state information based on the low interference level.

11. The method of claim 1 wherein the channel state measurements is one of:
an interference level, a power level, a signal to noise ratio, a signal to interference and noise ratio, a channel quality metric, or a block error rate associated with a hypothetical transmission.

12. The method of claim 1 wherein the periodicity is signaled to the first transceiver from the serving base station.

13. The method of claim 1 further comprising:
receiving an indication from the serving base station that identifies a subset of transmission resources within each subframe; and
wherein the measuring channel state comprises:
measuring channel state of the subset of transmission resources of the at least two subframes.

14. The method of claim 1 wherein the transmitting a report comprises:
transmitting an indicator that includes a time pattern, a time-frequency pattern, an index to a set of time patterns, an index to a set of time-frequency patterns, a vector of indices to a set of time patterns, or a vector of indices to a set of time-frequency patterns.

15. The method according to claim 1 wherein the report comprises:
a time division duplex configuration that matches the high-low interference pattern.

16. The method according to claim 1 wherein the measuring channel state comprises:
measuring channel state for a predetermined repetition period.

17. The method according to claim 16 wherein the measuring channel state comprises:
measuring channel state over multiple predetermined repetition periods; and
averaging measured channel state on a modulo basis to produce the channel state measurements.

18. The method according to claim 1 further comprising:
receiving an aggressor reference waveform from a second transceiver;
determining interference spatial characteristics based on the aggressor reference waveform; and
configuring spatial processing in the first transceiver based on the interference spatial characteristics.

19. The method according to claim 18 further comprising:
determining second transceiver characteristics from the aggressor reference waveform; and
transmitting information regarding the second transceiver characteristics to the serving base station.

20. A method for multi-radio coexistence comprising:
receiving, by a first transceiver, an aggressor reference waveform from a second transceiver, the second transceiver transmitting in a carrier frequency that is different from the carrier frequency of a serving base station of the first transceiver;
determining a spatial interference covariance matrix based on the aggressor reference waveform; and
configuring spatial processing in the first transceiver based on the interference spatial characteristics determined from spatial interference covariance matrix.

21. The method of claim 20 further comprising:
receiving at the first transceiver at least a portion of a subframe carrying an information payload from the serving base station;
demodulating the at least a portion of the subframe to recover the information payload by spatial processing at the first transceiver, wherein the spatial processing is configured based on the interference spatial characteristics.

22. The method for multi-radio coexistence according to claim 20 wherein the configuring spatial processing comprises:
Steering a null of an antenna system of the first transceiver toward the second transceiver.

23. A method for multi-radio coexistence comprising:
receiving, by a first transceiver, an aggressor reference waveform from a second transceiver, the second transceiver transmitting in a carrier frequency that is different from the carrier frequency of a serving base station of the first transceiver, wherein the second transceiver is not associated with the serving base station;
determining second transceiver characteristics from the aggressor reference waveform; and
transmitting information regarding the second transceiver characteristics to a serving base station.

24. A mobile device comprising:
an orthogonal frequency division multiple access (OFDMA) transceiver for measuring channel state on at least two subframes of a frame from a serving base station to create channel state measurements and for transmitting a report to the serving base station regarding a high-low interference pattern, wherein the high-low interference pattern indicates a high interference level for a first subframe and a low interference level for a second subframe; and
a controller, coupled to the transceiver, for determining the high-low interference pattern based on the channel state measurements.

25. The mobile device according to claim 24 further comprising:
a memory, coupled to the transceiver, for storing a second high-low interference pattern with a predetermined repetition period based on a time-dependent configuration of a potentially interfering second transceiver on an adjacent frequency band; and
wherein the report indicates whether the channel state measurements match the stored second high-low interference pattern.

26. The mobile device according to claim 24 wherein the transceiver is also for receiving an aggressor reference waveform from a second transceiver.

27. The mobile device according to claim 26 wherein the controller determines spatial characteristics of the second transceiver from the aggressor reference waveform and where the controller comprises:
an antenna controller for configuring spatial processing of the transceiver based on the spatial characteristics of the second transceiver.

* * * * *